United States Patent [19]

Murphree

[11] Patent Number: 4,939,702
[45] Date of Patent: Jul. 3, 1990

[54] BARRIER SONAR

[75] Inventor: Francis J. Murphree, Maitland, Fla.

[73] Assignee: United States of America as represented by the Secretary of Navy, Washington, D.C.

[21] Appl. No.: 747,037

[22] Filed: Jul. 19, 1968

[51] Int. Cl.[5] ............................................. G01S 15/00
[52] U.S. Cl. ..................................... 367/138; 367/87;
367/93
[58] Field of Search .......................... 340/3, 4, 5, 6, 16,
340/258, 258 A, 258 B; 343/5 PD; 367/87, 93,
138; 342/27

[56]     References Cited
U.S. PATENT DOCUMENTS 2,783,459  2/1957  Lienau et al. .......................... 367/93
2,999,225  9/1961  Gregg, Jr. et al. .................... 367/13
3,297,980  1/1967  Haslett ................................. 367/137
3,300,768  1/1967  Bystrom et al. ....................... 342/27
3,311,869  3/1967  Klund .................................. 367/138
3,329,929  7/1967  Burnett ................................ 340/852

Primary Examiner—Thomas H. Tarcza
Assistant Examiner—Daniel T. Pihulic
Attorney, Agent, or Firm—Sol Sheinbein; John Becker; Harvey David

[57]     ABSTRACT

An electronic barrier utilizes a bifurcated beam of wave energy to establish a barrier area having a null between the forks thereof. Objects encroaching on said beam cause a portion thereof to be scattered in the forward direction. Suitable receiver equipment located remote from the source of the bifurcated beam and responsive to the foreward scattered beam is connected to provide an indication of said encroachment.

8 Claims, 2 Drawing Sheets

BARRIER SONAR

The invention described herein may be manufactured and used by or for the Government of the United States of America for governmental purposes without the payment of any royalties thereon or therefor.

This invention relates to an object detection system of the barrier type. Systems of this type serve to detect an object upon the entry thereof into a region of wave energy supplied by the system. Such systems are useful to protect harbors, open sea anchorages, ground areas of military interest, and air space from surprise encroachment by enemy vehicles, personnel, or ordinance. It should not escape note, however, that such barrier detection systems have utility apart from their aforementioned military and naval defense applications. Particularly, it should be noted that such systems have advantageous applications in the fields of oceanography and marine biology for studying the movement of marine animals and other subsurface objects, as well as in astronomical sciences, where it is desired to detect the penetration of the upper atmosphere by extraterrestrial objects, e.g., meteorites.

It has been observed that the energy scattered in a forward direction from an object entering a beam of a wave energy field is generally of a greater magnitude than that returned to the region of origin of the wave energy field. In this discussion the word "forward" when applied to the energy field refers to the general direction of propagation of the wave energy field rather than the direction of movement of the object. Similarly, Applicant uses the word "scatter" to refer to the object-field interaction accounting for the wave energy caused to travel in the forward direction and the word "reflect" to refer to the object-field interaction accounting for the wave energy returned to the region of origin of the field. It is recognized that these words are not comprehensively descriptive of the interaction between the object and field but they are sufficiently so in the context of the discussion of Applicant's system, disclosed herein. Applicant has devised a unique method of, and system for, employing phased radiators and detectors to utilize this observed forward scatter phenomenon in a barrier type detection system of unprecedented effectiveness.

Prior art systems of the general type used for detection barriers have functioned by detecting wave energy reflected by an intruding object from a generated wave energy field, or, alternatively, by the detection of the alteration of energy distribution of a wave energy field including beam interruption. These methods of operation limit the ability to detect small objects such as swimmers, and the range of effectiveness of such barrier systems, or, correlatively, require a high power level of wave energy to be maintained for a given object size and barrier range. Simple beam interruption is not practical for long ranges because the beam spreads, thereby causing its cross-section to be much greater than the target. The aforementioned operational limitations mitigate seriously the use of barrier type detection installations in some otherwise desirable applications. Among these applications are remote telemetered installations such as sonar buoys, and terrasatellites.

An object of this invention is the provision of an object detector of the barrier type effective over a relatively long range with the consumption of a minimum of power.

A further object of this invention is the provision of a detection barrier system which utilizes a portion of a wave energy field scattered in a forward direction by an object encroaching on said field.

Further, it is an object of this invention to provide a method of establishing a barrier to give an alarm if the barrier is penetrated by an object.

Another object of this invention is to provide a new method of detection of the presence or passage of an object in an area energized by an energy field.

A further object of this invention is to provide a method and system of barrier penetration detection sensitive enough for the detection of small objects over large distances.

Still another object of said invention is the provision of an object detection barrier system employing a suitable arrangement of components to produce a bifurcated wave energy field having a narrow energy-free channel between the forks thereof.

Another object of this invention is to provide a bifurcated energy field which greatly reduces the reception of directly transmitted signals, thus making it possible to readily detect forwardly scattered target echoes.

Other objects and many of the attendant advantages will be readily appreciated as the subject invention becomes better understood by reference to the following detailed description, when considered in conjunction with the accompanying drawings wherein.

Applicant's method of detection is to establish a directional radiation field, to produce a region of low energy magnitude or modulation null extending along a centered axis of said field, and to detect, from a point on said axis, energy scattered from said radiation field in the direction of propagation by an object entering said radiation field.

The radiation field may be of any type appropriate to the environment where the detection barrier is to be established. In an aqueous medium, an acoustic field may be appropriate, whereas in free air or beyond the earth's gravitational held atmosphere an electromagnetic radiation field is considered more desirable. In either of the two later environments, an optical wavelength may be used to practice Applicant's invention to good advantage.

Aside from the radically different hardware used to produce the radiation field, the different environments require correspondingly different techniques to position the respective components, to align the various transmission and reception units, and to telemeter and to record the results. All of the aforementioned techniques required to practice the invention are conventional for working in the respective environments. For example, to work in a subaqueous medium positioning transducers and other equipment would obviously require diving equipment and personnel skilled in the use thereof, while the practice of the invention beyond the earth's atmosphere involves the use of rocket and satellite technology.

Figure 1:
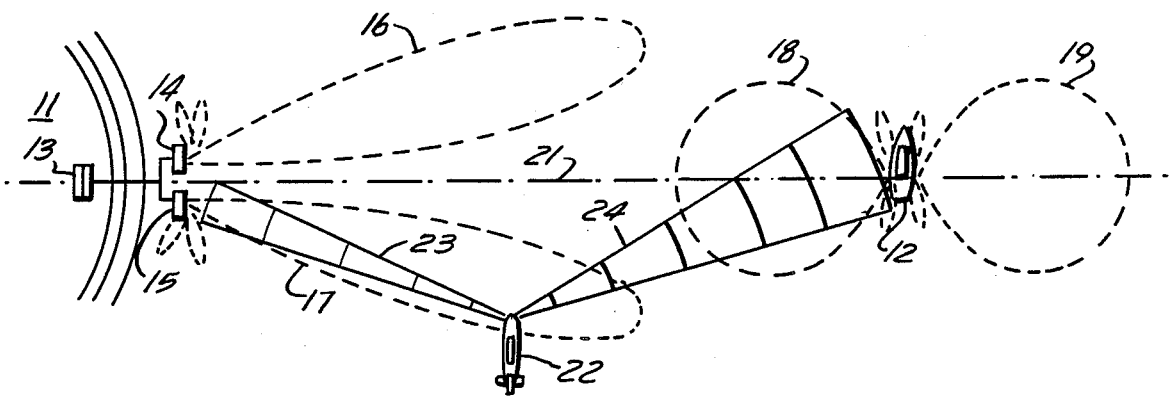
FIG. 1 is an illustration of a representative installation of Applicant's system.

Referring to FIG. 1, there is shown a representative arrangement of Applicant's invention using acoustic wave energy to establish an underwater submarine detection barrier. A shore point 11 and an anchored vessel 12 are the locations of the transmission equipment and the associated barrier reception equipment, respectively. Such an illustration is, of course, exemplarily only and the vessel 12 may be, in fact, another point of land, or the illustrated locations of the transmitter and receiver may be reversed. A shore station 13, housing the transmission equipment and such other communication and telemetering equipment as may be necessary or desirable to the operation of Applicant's barrier system as will be herein described, provides a driving signal to submerged acoustic transducers 14 and 15. The transducers 14 and 15, errected on the sea bottom by divers, may be of any conventional state of the art construction suitable for the particular frequency chosen and capable of operation at the power levels required to establish the desired range. In general, it is noted that several current state of the art piezoelectric type designs employing a plurality of spatially arranged ceramic type elements are suited for the practice of Applicant's invention, and choice among them is considered within the purview of a normally skilled acoustic detection and ranging engineer. Likewise, the arrangement of other types of individual transducer elements, i.e., dipoles, laser emitters, etc., into transducer units producing the desired beam patterns is within the scope of activities normally expected of appropriately trained personnel.

Each of transducers 14 and 15 produces a beam of acoustic energy, shown at 16 and 17, respectively, which are disposed about a zone of mutual contact and interaction marked by a centeral axis 21. It should be noted that the beams 16 and 17 are illustrated to show the general shape but not the range thereof. Aboard anchored vessel 12, or other suitable moored station, receiving equipment is located. The receiving equipment has a reception pattern 18, which is somewhat broadly shaped and centered on axis 21. When a barrier is desired to extend for a considerable distance, a second set of receiving equipment having a receiving pattern indicated at 19 may be located at the same receiving station, vessel 12, to face toward a second transmitter station, not shown. It should be observed that the placement and sensitivity of the receivers is such that in the absence of an object encroaching the transmitter beam little, if any, signals from beams 16 and 17 are received.

If, for example, a submarine 22 or other object attempts to pass through transmitter beams 16 or 17, a disturbing interaction between the object and said beams takes place. As a result of this object-beam interaction, a reflected signal 23 is returned to the region of transducers 14 and 15 and a higher intensity signal 24 is scattered in the forward direction. The scattered signal 24 is received by the receiver of anchored vessel 12, which, in turn, indicates to operating personnel that the barrier has been penetrated.

Figure 2:
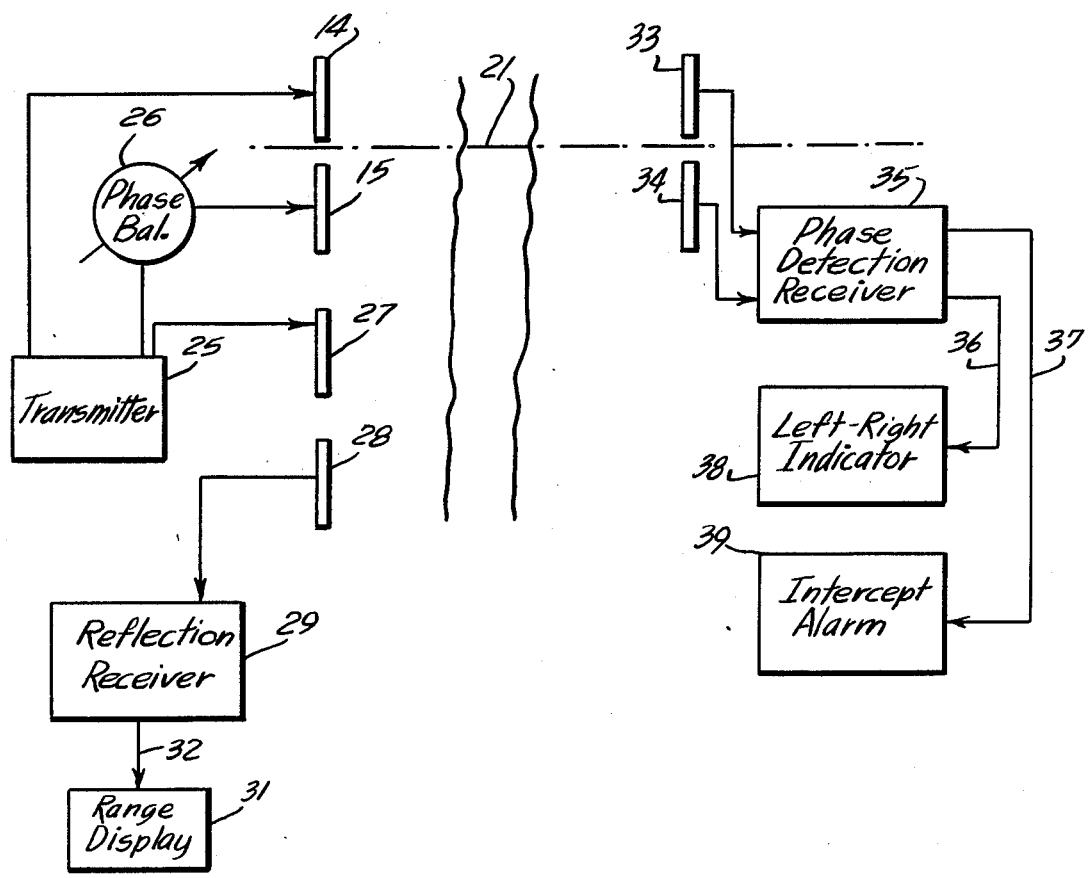
FIG. 2 is a block diagram of the subject invention.

The electronic components used in Applicant's system and for the practice of Applicant's method may be conventional state-of-the-art units interconnected in a manner which may be better understood with reference to FIG. 2. As previously noted, it should be understood that the invention may embrace a wide range of frequencies and, in general, is practicable in the microwave electromagnetic range as well as in the acoustic frequency range. However, for purposes of explanation the invention will be described in detail with reference to FIG. 2 as an acoustic arrangement.

Conventionally constructed directional acoustic transducers 14 and 15 are supplied with approximately equal driving energy from a transmitter 25. The driving energy for each of transducers 14 and 15 has a 180 degree phase relationship to that of the other. This phase difference, which produces a null along axis 21, is adjustable over a small range by means of a phase balance network 26. This adjustment permits compensation for transmission differences between the two connections to transducers and permits the alteration of the azimuth of axis 21 through small angles. The driving energy for transducers 14 and 15 may be continuous but is more commonly pulsed, with each transducer receiving a simultaneous burst of out-of-phase voltage.

If desired, a conventional type ranging system may be combined with the barrier transmitter 25 to indicate the range of the encroaching submarine 22. Such a ranging system may incorporate an independent transducer 27, or may use the transmitter beams produced by transducers 14 and 15. A receiving transducer or hydrophone 28 feeds an electrical signal produced by reflected signal 23 (see FIG. 1) to a reflection receiver 29. The range of submarine 22 can be then determined by classic time relation of the received and transmitted pulses and displayed on a suitable range display 31, which is joined to receiver 29 by a suitable communication link 32.

The barrier receiver portion consists of receiving transducer arrangement with two hydrophones 33 and 34 symmetrically located with respect to axis 21 and feeding phase detection receiver 35. The hydrophones 33 and 34 cooperate to produce a broad beam sensitivity pattern to enable the receiver to detect scattered signal 24 even through the object, submarine 22, is in either of transmitter beams 16 or 17. In the absence of an object entering either transmitter beam 16 or transmitter beam 17, the hydrophones 33 and 34 are impinged by substantially equal strength signals of transmitted wave energy, and phase detection receiver 35 may be adjusted to have no output. It is also apparent that the approximate position of the target is the intersection of an elipse and a line representing the direction of the incoming target echo, the direction of which may, in fact, be measured by the phase detector portion of said receiver 35. Said elipse is, of course, constructed with the transmitter and receiver transducers at the respective faci thereof, and the size thereof is determined by the difference in arrival times of the direct and reflected signals from the target. Should an object, such as submarine 22, enter a transmitter beam, the relative phase of scattered signal 24 with respect to either of the signals from transmitter beams 16 and 17 is different from the phasing therebetween and this difference would be detected by phase detection receiver 35 which would provide appropriate output signals via communication links 36 and 37 to left-right indicator 38 and an intercept alarm 39. The left-right indicator 38, as its name suggests, indicates which of the bifurcated transmitter beams 16 or 17 the object has entered and may be a meter or graphic recording apparatus. Intercept alarm 39 is an attention arresting device, such as a flashing light or audible alarm, and is actuated by signals indicative of either transmitter beams 16 or 17 having been penetrated by an object. It minimizes the likelihood of such penetration escaping the notice of operational personnel.

In actual installation, when used with reflection receiver 29 for range determination, it is preferable to have all readout devices, i.e., range display 31, left-right indicator 38, and intercept alarm 39, at the same location. If it is desired that such common location be on anchored vessel 12, communication link 32 may include conventional telemetry devices. Communication links 36 and 37 may be similarly include telemetry devices, should the barrier be desired to be operated from shore station 13. In the instance of shore operation, anchored vessel 12 may be advantageously replaced by a moored buoy housing the barrier receiver equipment and associated telemetry equipment.

It should be noted that the range determination need not be dependent upon a reflected signal, but could employ a network or grid system of transmitter beams similar to transmitter beams 16 and 17. However, if range determination by means of reflected signals is desired, transducer 27 may be dispensed with and the pulses from transducers 14 and 15 employed to provide range information. If barrier penetration detection alone is desired, the range determination circuitry, i.e., transducer 27, hydrophone 28, reflection receiver 29, and range display 31, may be omitted altogether.

As can be readily appreciated from the foregoing discussion, Applicant's devised interconnection of known, state-of-the-art components has resulted in a system and method uniquely capable of establishing an electroacoustic barrier. The utilization of forewardly scattered energy results in a barrier capable of extending over considerable distance with sufficient sensitivity to detect objects as small as swimmers and small swimmer delivery vehicles. Further, the insonifying power may be kept quite small, making detection of the beam difficult—a particular advantage in the instance of the protection of open sea anchorages, or deluding encroaching personnel who think the low energy beam is that of a prior art system, in believing that their presence is undetected because they are out of range of the barrier.

Figure 3:
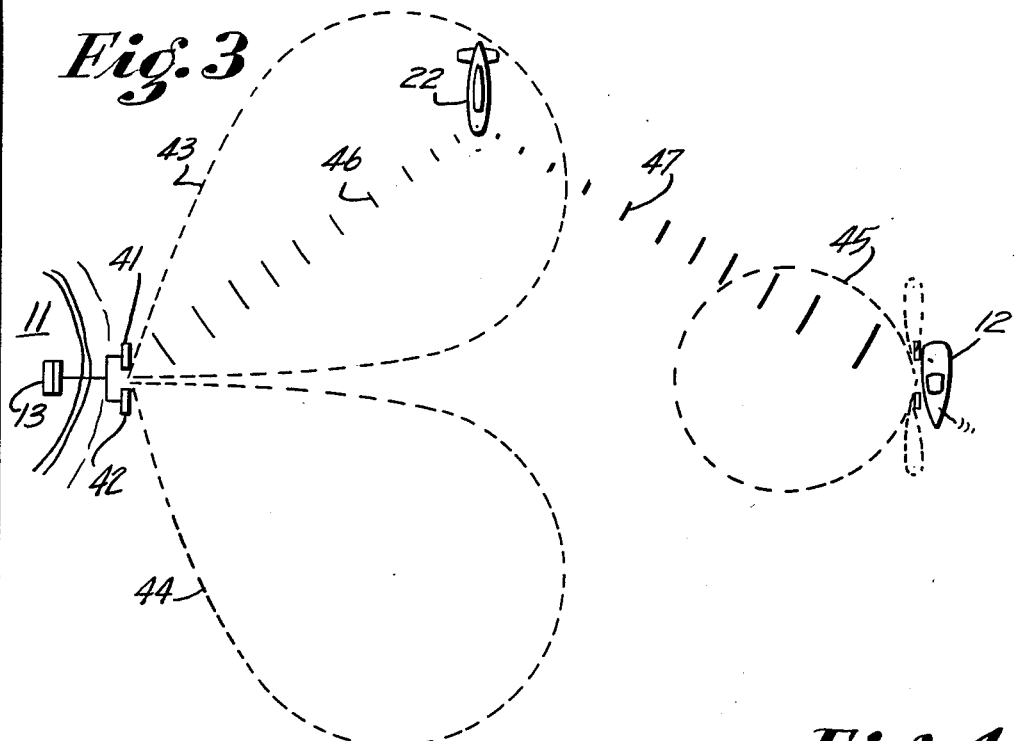
FIG. 3 is an illustration of a modified form of Applicant's system.

Although the acoustic frequency version described above and illustrated in FIGS. 1 and 2 is advantageously combined with an echo range determining system, it may also be combined with other types of radiant energy sensing systems with equal effectiveness. For example, FIG. 3 illustrates how a combination of Applicant's barrier system and a doppler speed sensing system might be constructed.

As in the case of the system of FIG. 1, two subsurface transducers 41 and 42 produce a bifurcated radiation pattern comprising transmitter beams 43 and 44. Unlike the beams of the system of FIG. 1, the transducers 41 and 42 are so constructed that transmitter beams 43 and 44 are broad enough to permit an encroaching object, submarine 22, to move in a range opening or closing manner with respect to the receiver, in order to permit the reception equipment located within anchored vessel 12 to detect the presence of said object by the doppler shifted scattered beam 45. As in the system of FIG. 1, a reflected beam 46 may also be utilized by the system, or the detection of the doppler drift may be made from scattered beam 47. It is understood, of course, that the barrier penetration is uneffected by the particular beam width of transmitter beams 43 and 44.

Figure 4:
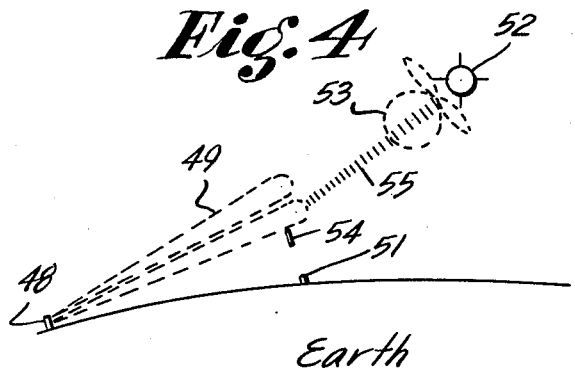
FIG. 4 depicts how Applicant's invention may be used to detect the launching of rockets or aircraft from a terrestial point remote therefrom.

FIG. 4 illustrates how electromagnetic radiation in the centimeter wavelength region might be utilized to detect the launching of a rocket from an area beyond the horizon. A suitable antenna array 48 transmits a bifurcated beam 49 of electromagnetic radiation at a low angle to establish a barrier across the horizon. Bifurcated beam 49 extends over an area where potential launch sites may be located including launch site 51. Above the earth's atmosphere in stationary orbit is a satellite 52 housing suitable barrier reception equipment and associated reception pattern 53 as well as necessary telemetry equipment. A rocket 54 from launch site 51 entering bifurcated beam 49 causes a scattered beam 55 to activate the receiver equipment in satellite 52. The telemetry equipment relays the information of barrier penetration to a suitable earth monitoring station which may or may not be located with antenna array 48, as conditions warrant. It is understood that bifurcated beam 49 has considerable extent in the plane of radiation most nearly parallel to the surface of the earth, so as to cover as great a geographical area as possible.

Figure 5:
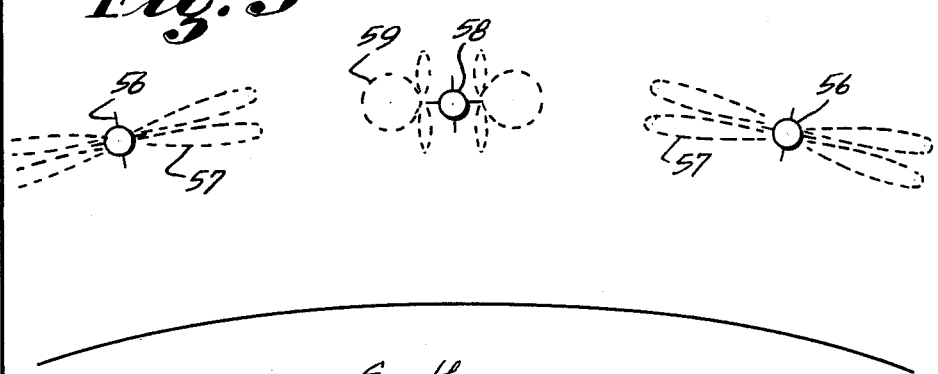
FIG. 5 illustrates how Applicant's barrier system may be employed as an object detection barrier above the upper atmosphere to detect the approach of earth directed objects.

FIG. 5 illustrates how a series of satellites may be used to establish a barrier system of the type previously discussed. Transmitter satellites 56 are placed in stationary orbit with the characteristic bifurcated transmitter beams 57 aligned so as to form a radiation belt about the earth. Receiver satellites 58 are spaced between transmitter satellites and are positioned such that their reception patterns 59 are aligned with the null position of the transmitted beam. As in previously explained installations, a penetration of the transmitter beam 57 by objects headed in either direction results in a scattered portion of the beam being detected by receiver satellites 58. Upon receipt of the scattered signals, appropriate signals are telemetered back to earth to indicate that penetration has occurred.

From the foregoing description, it is seen that Applicant has devised an improved arrangement and method of establishing a barrier type detection system. Applicant's system and method have advanced the state of the art, overcome certain deficiencies in the prior art, and fulfill the aforerecited objects of invention. Because of the greater magnitude of the scattered radiation in comparison to the reflected radiation, the invention is particularly useful in the detection of small craft and swimmers.

The foregoing description taken together with the appended claims constitute a disclosure such as to enable a person skilled in the electronic detection and ranging arts and having the benefit of the teaching contained therein to make and use the invention. Further, the structure herein described meets the objects of invention, and generally constitutes a meritorious advance in the art unobvious to such a skilled worker not having the benefit of the teachings contained herein.

What is claimed is:

1. A method of detecting the presence of an object in a predetermined area comprising the steps of:
    placing a plurality of individual transducers in cooperative relationship to one another and in ordered spatial relationship to said predetermined area;
    energizing certain of said transducers with a first alternating electrical signal;
    energizing the remaining transducers with a second alternating electrical signal of the same frequency as said first alternating electrical signal and with a predetermined phase relationship thereto so as to establish throughout said predetermined area a pair of phase related energy fields which interact to produce, at their intersection, a narrow zone of cancellation;

positioning a receiver responsive to the frequency and relative phasing of said first and second alternating electrical signals remote from said plurality of individual transducers and along said zone of cancellation;

adjusting the phasing of said second alternating electrical signal until said receiver has a minimum output in the absence of an object disturbing said phase related energy fields; and feeding the output of said receiver, via suitable communication links, to indicator devices to display receiver output upon reception of energy scattered in the forward direction by objects encroaching on either of said energy fields.

2. A method of detecting the presence of an object in a predetermined area according to claim 1 in which the step of placing a plurality of individual transducers includes submerging an electroacoustic transducer within an aqueous medium.

3. A system for indicating the presence of an object in a predetermined area comprising:

a plurality of transducers cooperatively arranged in two groups with respect to each other and spatially oriented with respect to said predetermined area;

a source of two alternating current electrical signals of a common frequency and of differing phase electrically connected to one of said groups of said plurality of transducers thereby conducting thereto one of said alternating current electrical signals to generate therefrom a first beam of wave energy in said predetermined area;

a phase adjustment means connecting the remaining group of said plurality of transducers to said source of two alternating current electrical signals to conduct and alter the phase of the remaining one of said alternating current electrical signals so as to permit adjustment of the phase of a second beam of wave energy generated by said remaining group of said plurality of transducers in said predetermined area, thereby permitting the positioning of the zone of interaction of the aforesaid two wave energy beams;

receiver means responsive to the relative magnitude and phase of the two wave energy beams, remotely positioned from said plurality of electrical transducers and within said zone of interaction of said two wave energy beams, and characterized by having outputs indicative of any alteration of relative balance between said two wave energy beams and which of said two wave energy beams has increased in magnitude; and indicator means connected by suitable communication links to said receiver means adapted to utilize said receiver outputs to provide suitable sensory information to operating personnel corresponding to predetermined changes of said receiver outputs.

4. A system according to claim 3 in which said transducers are electromagnetic radiators.

5. A system according to claim 4 in which said receiver means is housed within an earth-orbiting satellite.

6. A system according to claim 3 wherein said plurality of electrical transducers are electroacoustic transducers.

7. A system according to claim 6 additionally comprising:

a second receiver means located at the location of said source of two alternating signals and responsive to signals reflected thereto from said object in said predetermined area to determine the range thereof; and indicator means connected by a suitable communication link to said second receiver means to indicate to operating personnel the range of said object.

8. A system according to claim 7 in which at least one of said suitable communication links comprises a telemetry system.

* * * * *